United States Patent
Kam et al.

(10) Patent No.: US 9,772,666 B1
(45) Date of Patent: Sep. 26, 2017

(54) MULTI-LEVEL BATTERY MANAGEMENT

(71) Applicant: Google Inc., Mountain View, CA (US)

(72) Inventors: Pascal Kam, Union City, CA (US); Tracy Van Dyk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 14/021,591

(22) Filed: Sep. 9, 2013

Related U.S. Application Data

(60) Provisional application No. 61/698,248, filed on Sep. 7, 2012.

(51) Int. Cl.
*G06F 1/28* (2006.01)

(52) U.S. Cl.
CPC .................................... *G06F 1/28* (2013.01)

(58) Field of Classification Search
CPC .... H02J 9/061; G06F 1/30; G06F 1/28; G06F 1/26; G06F 1/263; G06F 1/266; G06F 1/32; G06F 1/305; G06F 1/3212; G06F 1/3206; G06F 1/3218; G06F 1/3221; G06F 1/3225; G06F 11/3006; G06F 11/3017
USPC ........ 340/6.1, 3.1, 3.42, 3.43, 3.44, 4.3, 5.1, 340/6.11, 16.1, 333, 825.3; 713/310, 300, 713/340; 709/224
See application file for complete search history.

(56) References Cited

U.S. PATENT DOCUMENTS

| | | | |
|---|---|---|---|
| 5,973,475 A | 10/1999 | Combaluzier | |
| 6,274,950 B1 * | 8/2001 | Gottlieb | G01R 31/3648 307/66 |
| 6,983,212 B2 | 1/2006 | Burns | |
| 7,313,714 B1 * | 12/2007 | Helfinstine | G06F 1/28 307/18 |
| 7,598,700 B2 | 10/2009 | Elder et al. | |
| 8,013,611 B2 | 9/2011 | Elder et al. | |
| 8,120,364 B2 | 2/2012 | Elder et al. | |
| 8,761,050 B2 | 6/2014 | Lu et al. | |
| 8,769,327 B2 | 7/2014 | Lu et al. | |
| 2003/0138690 A1 * | 7/2003 | Matsui | H01M 10/48 429/61 |
| 2010/0292877 A1 | 11/2010 | Lee | |
| 2011/0113263 A1 * | 5/2011 | Bi | G06F 1/263 713/300 |

(Continued)

FOREIGN PATENT DOCUMENTS

| | | | | |
|---|---|---|---|---|
| JP | WO 2012050206 A1 * | 4/2012 | | H02J 3/14 |
| WO | WO 2013/184695 | 12/2013 | | |

*Primary Examiner* — Steven Lim
*Assistant Examiner* — Mancil Littlejohn, Jr.
(74) *Attorney, Agent, or Firm* — Fish & Richardson P.C.

(57) ABSTRACT

A system for providing battery status information can include a plurality of battery packs that each include a plurality of battery cells, a computer system for performing battery condition checks, and an interface for communicating information about a respective battery cell to a power supply that is connected to receive power from a respective battery pack; a plurality of power supplies to communicate with the battery packs to cause the battery packs to perform defined operations and to receive information from the battery packs that is generated from the defined operations; and a central power management system connected over a network with the plurality of power supplies and arranged to obtain information from the defined operations performed by the battery packs.

23 Claims, 8 Drawing Sheets

(56) References Cited

U.S. PATENT DOCUMENTS

| | | | |
|---|---|---|---|
| 2011/0320832 A1 | 12/2011 | Boss et al. | |
| 2012/0098343 A1* | 4/2012 | Harris | G06F 1/183 307/48 |
| 2012/0158338 A1* | 6/2012 | Yang | G01R 31/362 702/85 |
| 2013/0218358 A1* | 8/2013 | Yamada | H02J 3/14 700/292 |

* cited by examiner

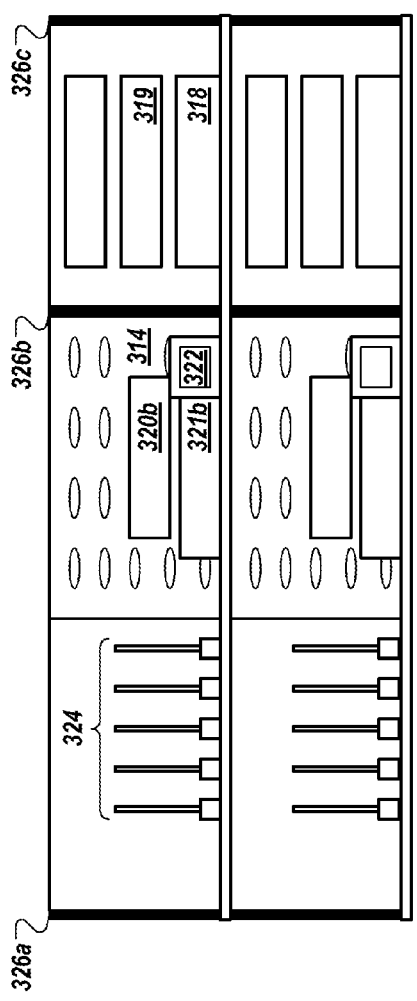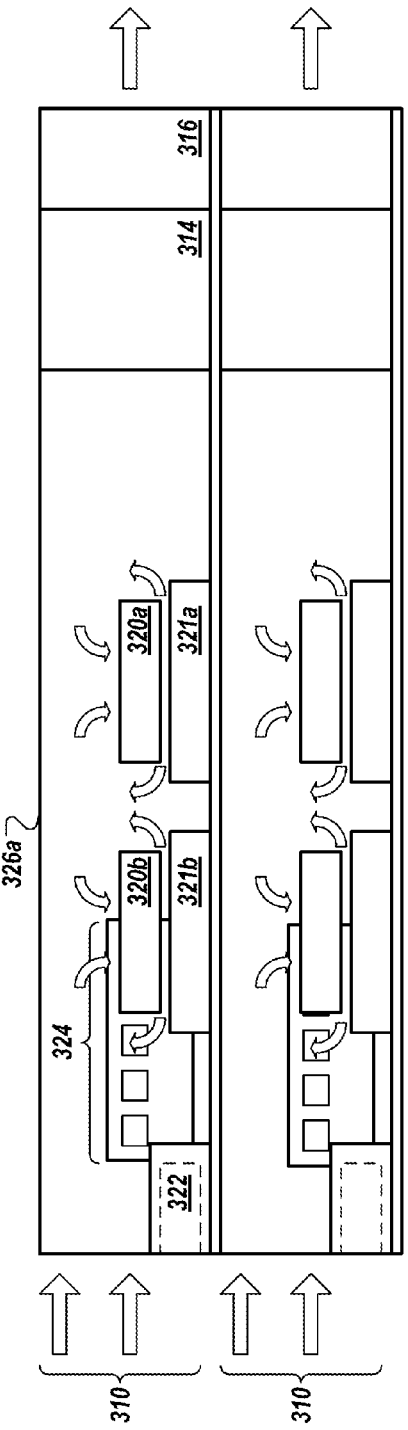
FIG. 3B
FIG. 3C

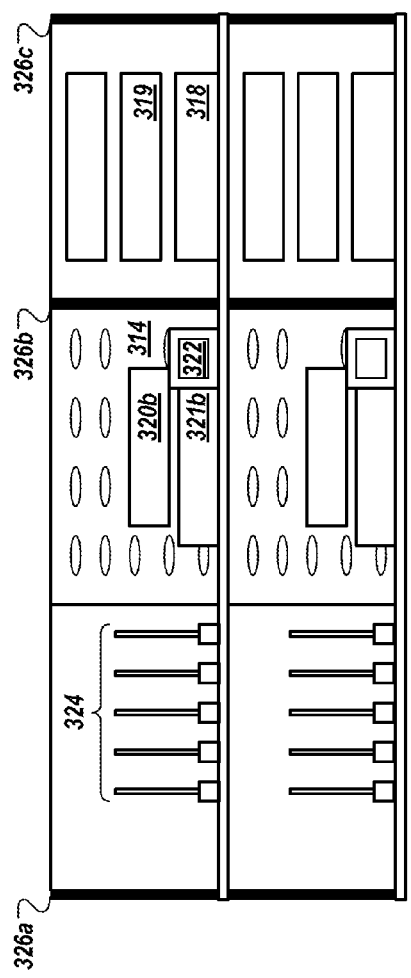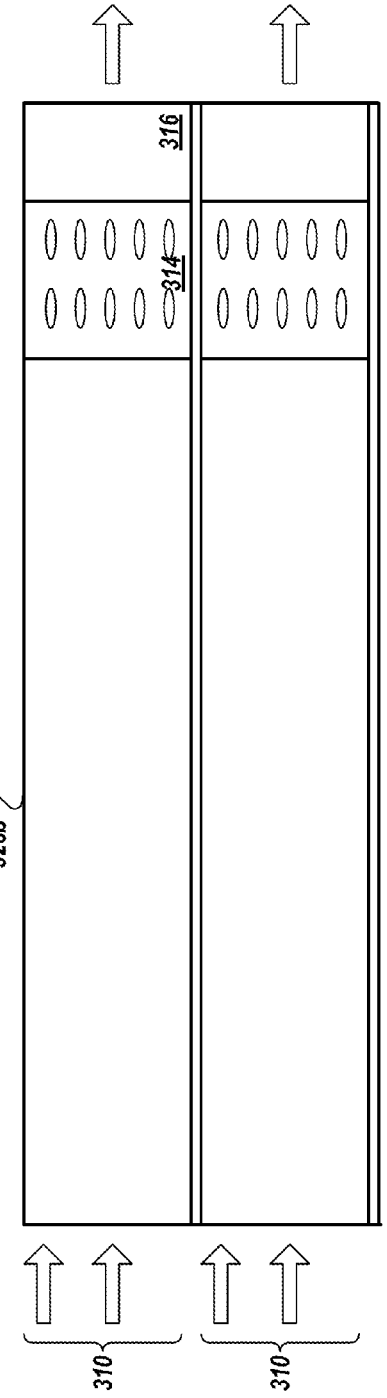
FIG. 3E
FIG. 3F

MULTI-LEVEL BATTERY MANAGEMENT

CROSS-REFERENCE TO RELATED APPLICATIONS

This application claims priority to U.S. Provisional Application Ser. No. 61/698,248, filed on Sep. 7, 2012, entitled "Multi-Level Battery Management," the entire contents of which are hereby incorporated by reference.

TECHNICAL FIELD

This document relates generally to managing the operations of battery packs in a computer data center.

BACKGROUND

Uninterruptible power supplies (UPSs) have been used as a bridge to supply power to computer servers when a main source of power (e.g., utility power) fails—e.g., long enough for the servers to shut down cleanly and transfer their work. Some approaches have included a single large UPS that may provide emergency power to multiple servers in a data center. Some approaches have included a distributed array of UPSs.

Data center batteries may be idle for long periods. Thus, the batteries may need to be periodically tested to make sure they are still fully operational. In general, lead-acid batteries may have unpredictable failure modes. In contrast to lead-acid batteries, lithium ion batteries generally have more predictable failure modes, and are generally smaller, work better in warm environments, and have a longer life. However, lithium ion batteries need to be monitored and controlled to prevent them from overheating, and potentially catching fire or exploding.

SUMMARY

This document discusses systems and techniques for communicating between a back-up supply of electric power (e.g., a battery pack) and a system that is served by that supply of power. For example, computer servers in a computer data center may each be served by a power supply and an associated battery pack, which may be a rechargeable battery pack (e.g., lithium ion, or Li-ion). A controller or other form of microprocessor and associated processors may be included in the battery pack to make it a "smart" battery pack.

A host or master to the battery pack, such as a power supply that services one or more servers and can receive electric power from the battery pack, may be arranged to communicate to and from the battery pack. The battery pack and the power supply may communicate over a single-wire serial data connection, while the power supply may in turn communicate with the server to which it provides electric power via an I2C (inter-integrated circuit) computer bus. The server may in turn communicate via the I2C bus with a number of other components that service the server, and may communicate with other servers and with a central management system via a third network, such as an Ethernet or InfiniBand network. The third network may be a "management" network that is used for controlling what actions each server and associated hardware take, and can be the same as or different from the network over which the server services the main data that it processes (e.g., data associated with requests that come in and out of the data center from users of the data center, such as search requests, requests to serve documents, requests to serve web pages, and the like).

The communication between the power supply and the battery pack may occur in two directions, in a master (power supply)/slave (battery pack) relationship. Also, the power supply may be a slave to the server, as master. For example, in one implementation, a central system may communicate to the server that it would like information about the health of the battery pack that serves the server (e.g., its voltage, its charge level, its chargeability status, etc.). The server may in turn ask the power supply to request such information, and the power supply may communicate to the battery pack, which may launch operations (via its programmed microprocessor) to gather the appropriate information, after which the gathered information may be passed to the power supply, the server, and to the central system. (The central system may also communicate with the power supply without the communication going through the server that is served by the power supply.)

In some examples, the battery pack may determine that it needs to perform certain tests in order to obtain the information requested by the power supply, such as a stress test to identify one or more factors that characterize the current health off the battery pack as a whole, or of particular cells within the pack. The power supply may also make requests to the battery pack without being specifically prompted from a higher level of the system for each test. For example, the power supply may store a schedule that defines when the battery pack should be tested, and may trigger a test upon determining that such times have come. The power supply may also aggregate data from the battery pack over time, and may summarize it and pass it on to a higher level only upon the occurrence or a certain event (e.g., the battery health falls below a predetermined level that indicates manual intervention may be required) or a certain time (e.g., sending in a report each week or month).

The testing and other activities of the battery pack may also involve cooperation between the power supply and the battery pack. For example, if a stress test is to be performed, the power supply may notify the battery pack, which may perform the stress test entirely internally to itself, or may signal back to the power supply so that the power supply puts a load on the battery pack and thus performs a stress test. Measurements for determining the performance of the battery pack in the test may come from sensors in the battery pack, sensors in the power supply, or both.

Such systems and techniques may, in certain implementations, provide one or more advantages. By providing a distributed configuration of uninterruptible power supplies (UPSs) for computer servers, isolated failure domains may be created. In a large-scale distributed UPS environment, battery pack failures may be easily locatable, diagnosable, and fixable (e.g., a central management system may provide a technician of an address in the facility where the faulty pack is located). Servers that are not directly linked to a point of battery pack failure may be unaffected during maintenance. A central system controller can also manage power supplies for hundreds or thousands of servers. Moreover, status information may be appropriately routed and acted upon.

In one aspect of the present disclosure, a power-supply system is disclosed. The system includes a plurality of battery packs that each include a plurality of battery cells, a computer system for performing battery condition checks, and an interface for communicating information about a respective battery cell to a power supply that is connected to receive power from a respective battery pack; a plurality of power supplies, each connected to receive power from an associated one or more of the plurality of battery packs, and to communicate with the associated one or more battery packs to cause the associated one or more battery packs to perform defined operations and to receive information from the associated one or more battery packs that is generated from the defined operations; and a central power management system connected over a network with the plurality of power supplies and arranged to obtain, from the plurality of power supplies, information from the defined operations performed by the battery packs.

In addition, the power supplies can be connected to communicate with the central power management system through respective computers that receive electrical power from particular ones of the power supplies. The power supplies can be programmed to trigger testing of their respective battery packs autonomously, to store the information, and to later provide the information to the central power management system in response to determining that a defined event has occurred. Each power supply can be connected to one or more battery packs via a single-wire interface, and can be connected to the central power management system by a local area network.

In another implementation, a power-supply system includes a battery pack that includes a plurality of rechargeable battery cells; a processor connected to test the plurality of rechargeable battery cells and arranged to execute a diagnostic routine for determining a state of health of the battery cells; and an electronic communications interface arranged to communicate with a central power management system that controls a plurality of battery packs that each serve one or more distinct electric machines. The battery pack can be programmed to respond to a request from the central power management system for status information and to respond with data that indicates a current status of the plurality of battery cells.

In addition, the system may include a connector on the battery pack arrangement attached to a power supply for powering a computer server system. The connector can implement a single-wire connection for communicating between the battery pack and the power supply. The system may include a computer power supply. The power supply can be arranged to supply direct current power to one or more computers in a computer system, and the electronic communications interface can communicate with the central power management system through the power supply. The power supply can communicate with the battery pack over a single-wire connection and can communicate with other components via an i2C bus. The power supply may be arranged as a master, and the battery pack as a slave, in a master-slave relationship. The battery pack may be a slave to a computer that is served by the power supply. The power supply can be programmed to request information from the battery pack without being prompted and to store information received from the battery pack until occurrence of a defined event, upon which the power supply provides the information to a central power management system. The power supply can be connectable to multiple battery packs at one time. The battery pack can have an assigned IP address. The electronic communication interface can be arranged to communicate with other battery packs in a power supply system.

In yet another implementation, a method is disclosed for managing power in a computer server system. The method includes performing battery self-checks by a processor in a battery pack that is connected to supply electrical back-up power to a power supply that serves a computer server system; communicating information about the self-checks to the power supply; and communicating the information from the power supply to a central power management system that receives information from more than one hundred battery packs.

In addition, the method for managing power in a computer server system may include communicating the information from the power supply to a computer served by the power supply before communicating the information to the central power management system. The information may be communicated from the battery pack to the power supply in response to a request from the power supply but without a request from the central power management system, and may be stored at the power supply until the occurrence of a determined event, at which time the information may be communicated to the central power management system. The determined event may include a request from the central power management system, an occurrence of a determined time or elapsed time, a determination that a condition of the battery pack has been met, and/or an accumulation of a determined amount of data at the power supply. The information may be transformed by the power supply before being sent to the central power management system. The information may be communicated from the battery pack to the power supply over a single-wire interface. The information may be communicated from the power supply to the central power management system over a shared local area network.

All or part of the foregoing may be implemented as a computer program product including instructions that are stored on one or more non-transitory machine-readable storage media, and that are executable on one or more processing devices. All or part of the foregoing may also be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

FIG. 3B shows a front view of the tray in FIG. 3A.

FIG. 3C shows a side view of the tray in FIG. 3A.

FIG. 3E shows a front view of the tray in FIG. 3D.

FIG. 3F shows a side view of the tray in FIG. 3D.

Like reference symbols in the various drawings indicate like elements.

DETAILED DESCRIPTION

In general, this document discusses battery packs for an uninterruptible power supply (UPS) system that include their own processors that can perform testing, management, and reporting functions. A particular battery pack may communicate in a multi-level arrangement with a host (e.g., a smart power supply) that can perform additional functions (e.g., switching between main and back-up power, conditioning power, converting power from AC to DC, etc.). In turn, the host may communicate with a central system that can manage hundreds or thousands of battery pack/power supply systems and servers.

Figure 1:
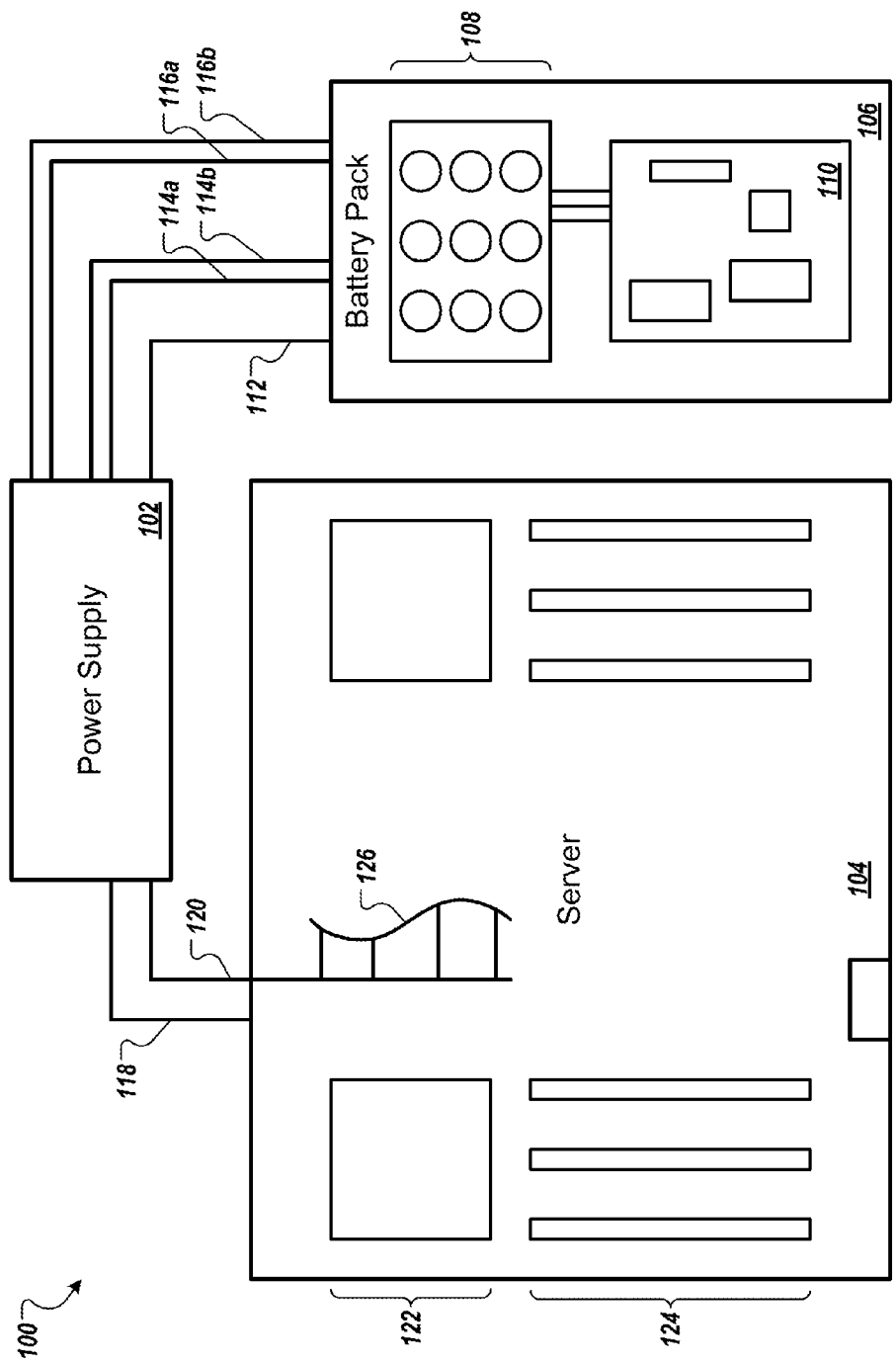
FIG. 1 is a conceptual diagram of a power-supply system that can provide battery pack status information.

FIG. 1 is a conceptual diagram of an example power-supply system 100 that can provide battery pack status information. The power-supply system 100 includes a power supply 102 configured to supply power to a computer server 104. The computer server 104 may be implemented as a variety of components on a computer motherboard that may be mounted in a bay of a rack-mount system, such as by being placed horizontally on a tray that serves as one of many shelves in a bay. The computer server 104, for example, may be included in a group of servers (e.g., a data center, a server farm, a cloud environment, etc.) and may provide computing services (e.g., communications, search results, maps and navigation data, etc.) to various client computing devices (e.g., smartphones, tablets, laptops, desktops, other servers, etc.). The power supply 102, for example, may supply regulated direct current (DC) power to the computer server 104, generally converted from an alternating current (AC) power source such as an electric utility. However, if a main power source is interrupted (e.g., the electric utility's infrastructure fails), the power supply 102 may detect the interruption and instead use an alternate or back-up source of power.

A battery pack 106, for example, may serve as a back-up source of power for the power supply 102. The battery pack 106 may include a suitable number of battery cells 108, such as rechargeable (e.g., lithium ion, or Li-ion) cells that may be interconnected in series or parallel (or both) to provide electrical connectivity between the cells. Moreover, the battery pack 106 may include various sensors (e.g., temperature, voltage, current, etc.) for monitoring each of the individual battery cells 108 (and/or for monitoring the group of cells as a unit), and may include various controllers (e.g., regulators, balancers, fans, etc.) for controlling battery cell charge rates, output voltage, temperature, and other appropriate battery cell functions and characteristics. The battery pack 106, for example, may include a processor 110 connected and arranged to execute a diagnostic routine for determining a state of health of the battery cells 108. For example, the processor 110 may monitor the battery cells 108 to determine whether the cells should be recharged (e.g., the cells currently hold a charge level under a predetermined threshold), replaced (e.g., the cells are no longer able to hold a predetermined charge level), and/or whether any emergency measures should be taken (e.g., a chemical leak or temperature spike is detected).

To provide power to the power supply 102, for example, the battery pack 106 may include a connector 112 (e.g., a single-wire connection). Moreover, the connector 112 may also be used by the battery pack 106 to receive power from the power supply 102 for recharging, for example. In some implementations, in addition to (or instead of) transmitting power, a single wire connection may be used to transmit data. For example, the connector 112 may be used to transmit power and communicate data between the battery pack 106 and the power supply 102. In some implementations, battery packs may provide (and/or receive) power and may communicate data using different connectors. For example, the battery pack 106 may send data to and receive data from the power supply 102 using the single-wire connector 112, and may transmit power using direct current power connectors 114a and 114b (e.g., for supplying back-up power to the power supply), and/or alternating current power connectors 116a, 116b (e.g., for recharging the battery pack). The data and power connectors may be part of a single cable bundle in certain implementations, and may share a single connector at one or both ends (or have multiple connectors).

In some implementations, a power supply may be arranged as a master, and a battery pack as a slave, in a master-slave relationship. For example, the power supply 102 may be arranged to issue commands to and request status information from the battery pack 106. To request status information (e.g., charge level, discharge rate, temperature, etc.) from the battery pack 106, for example, the power supply 102 can send a message (e.g., encoded electrical signals) to the battery pack 106, via the connector 112. Upon receiving the message, for example, the battery pack 106 can use the processor 110 to read (e.g., decode) the message and can execute programmed instructions to perform one or more actions (e.g., monitoring and/or controlling actions) on the battery cells 108. Upon performing the actions, for example, the battery pack 106 may in turn generate a message that includes data that indicates a current status of the battery cells 108, and may send the message to the power supply 102 via the connector 112. Moreover, in some implementations, a power supply may be connectable to multiple battery packs at one time. For example, the power supply 102 may concurrently communicate with, receive power from, and/or transmit power to multiple battery packs (e.g., battery pack 106) using multiple connections (e.g., single wire connector 112). Thus, for example, a single power supply could access multiple back-up sources of power to provide further redundancy.

The power supply 102 can use a power connector 118, for example, to provide direct current power to the computer server 104. Moreover, the power supply 102 (i.e., a smart power supply which includes one or more processors, memory devices, and communications interfaces) may use software-based processes to cap the current it provides, thus supplying constant current and constant voltage to the computer server 104. Further, the power supply 102 can send data to and receive data from the computer server 104 (and other system components) via an inter-integrated circuit (I2C) bus 120. The computer server 104, for example, can provide power received from the power supply 102 to one or more processors 122, computer-readable memory devices 124, and other components of the server 104 which may use power.

In some implementations, a battery pack may be a slave to a computer that is served by a power supply. For example, the computer server 104 may use an inter-integrated circuit bus interface 126 to issue commands to and request status information from one or more power supplies (e.g., power supply 102) and/or one or more battery packs (e.g., battery pack 106). Upon receiving a message (e.g., a command and/or a request for information) from the computer server 104, for example, the power supply 102 may use one or more assigned network identifiers (e.g., Internet Protocol (IP) addresses, Media Access Control (MAC) addresses, etc.) included in the message to identify an intended message recipient and/or to perform an appropriate action. If the message is intended for the power supply 102, for example, the power supply 102 may read the message and perform an action associated with the message. However, if the message is intended for the battery pack 106, the power supply 102 may directly forward the message to the battery pack, or may reformat (e.g., translate) the message prior to forwarding. Thus, in the present example, in addition to transmitting power to and from a battery pack, a power supply may perform network routing functions, sending data to the battery pack based on the pack's assigned network identifier.

Figure 2:
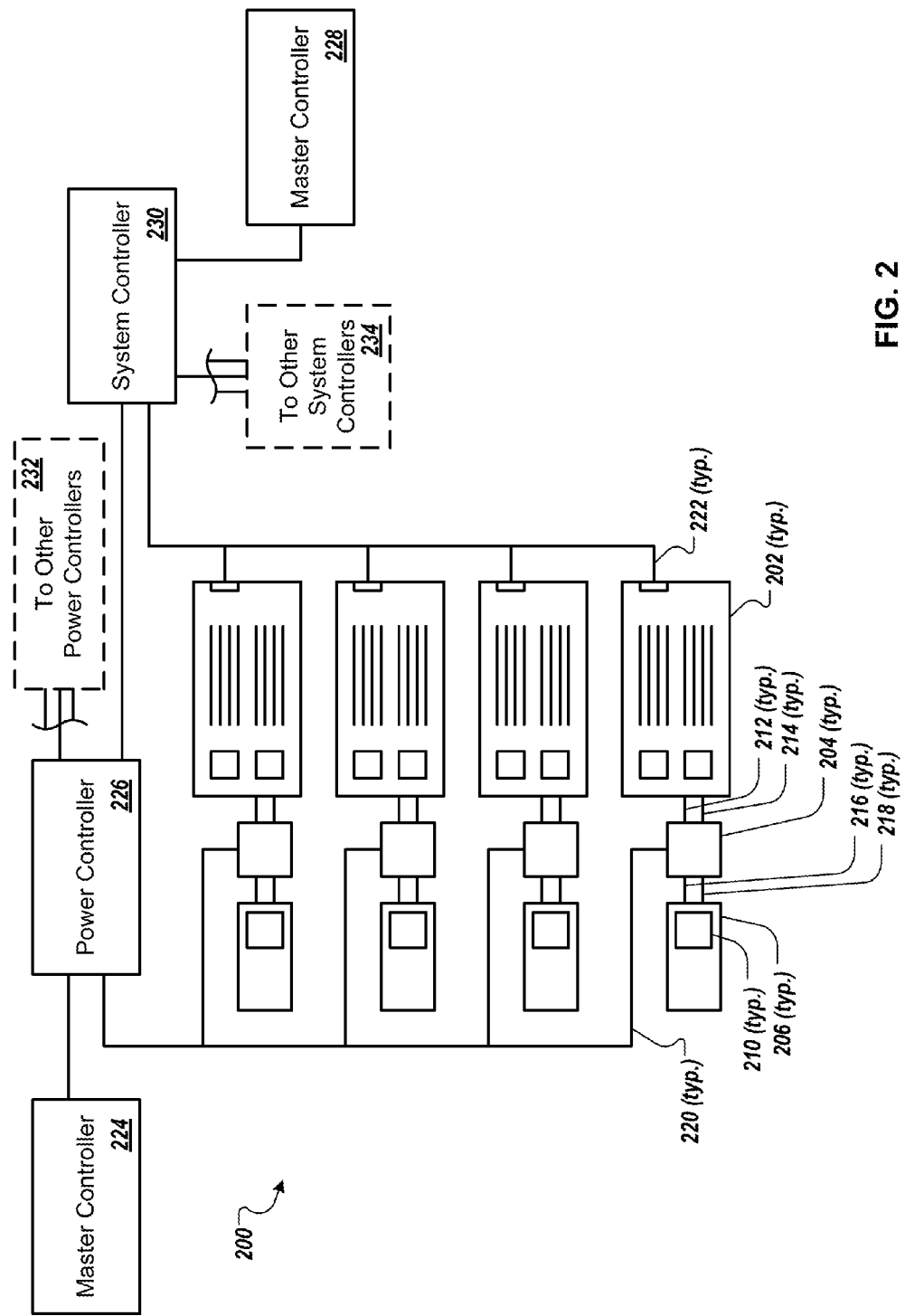
FIG. 2 is a conceptual diagram of a power management system connected over a network to multiple power-supply systems.

FIG. 2 is a conceptual diagram of an example power management system 200 connected over a network to multiple power-supply systems. Each of the power-supply systems included in the power management system 200, for example, may be similar to the power-supply system 100 (shown in FIG. 1), and will be described below in terms of a typical configuration. However, alternate power-supply system configurations may be used, and the various power-supply systems included in a networked system may or may not have identical configurations. For example, some power-supply systems in a networked system may use single battery packs, others may use multiple battery packs, and others may share battery packs with other power-supply systems. Similarly, while each part of a system may be common when the system is initially brought on-line, the particular arrangement for each such part may change over time, so that various parts will vary. For example, a system may start with metal hydride batteries and switch over a period of time to lithium ion battery packs.

A typical power-supply system that is part of the power management system 200 can include a computer server 202, a power supply 204 to the server, and a battery pack 206 to supply power if a main power source is interrupted. The battery pack 206 may typically include a suitable number of battery cells 210 (e.g., rechargeable lithium cells), which may be repaired or replaced under appropriate conditions (e.g., if the cells are defective, damaged, or expired). To provide power to the computer server 202, for example, the power supply 204 can use a power connector 212 (e.g., a direct current power cable). To send data to and receive data from the computer server 202, for example, the power supply 204 can use a data connector 214 (e.g., an inter-integrated circuit bus or another suitable data connector). Power (e.g., alternating and/or direct current) can be transmitted between the power supply 204 and the battery pack 210 via a power connector 216, and data can be transmitted via a data connector 218. In some implementations, data and power may both be transmitted between the power supply 204 and the battery pack 206 via a single wire interface.

The power management system 200 may include multiple (e.g., hundreds or thousands of) battery packs, power supplies, and computer servers. The battery packs (e.g., battery pack 206) included in the system 200, for example, may each include a computer system for performing battery condition checks, and may each include an interface (e.g., data connector 218) for communicating information about one or more respective battery cells (e.g., battery cells 210) to a power supply (e.g., power supply 204) that is connected to receive power from a respective battery pack. The power supplies (e.g., power supply 204) included in the system 200, for example, may each be connected to receive power from one or more associated battery packs (e.g., battery pack 206), and may each communicate with its associated battery pack(s) to cause the battery pack(s) to perform defined operations (e.g., monitoring, testing, charging, discharging, regulating, balancing, temperature and/or humidity controlling, and other appropriate operations), and to receive information (e.g., status messages) from its associated battery packs that are generated from the defined operations.

To control, monitor, and collect information from multiple battery packs and power supplies, for example, the power supplies may be connected over a local area network (e.g., Ethernet, InfiniBand, or another appropriate network) to a centralized power management system. The power supply 204, for example, may be connected via a network connection 220 to other components (e.g., power and system controllers) included in the power management system 200. In some implementations, power supplies may be connected to communicate with the centralized power management system through respective computers that receive electrical power from particular power supplies. For example, the power supply 204 may transmit relevant data (e.g., data related to its own status and operation, and that of its associated battery pack 206) to the computer server 202, which may forward such data via a network connection 222.

Moreover, battery packs may include an electronic communications interface arranged to communicate with a centralized power management system, and the power management system may be configured to control the battery packs. For example, a battery pack (e.g., battery pack 206) that serves one or more distinct electrical machines (e.g., computer server 202) may transmit data through various paths. As a possibility, the battery pack 206 may send and receive data via data connector 218, through the power supply 204, and via network connection 220. As another possibility, the battery pack 206 may transmit data via data connector 218, through the power supply 204, via data connector 214, through the computer server 202, and via network connection 222. Using the network connection 220 and/or 222, for example, the power management system 200 may cause the battery packs (e.g., battery pack 206) to perform defined operations, and may obtain information related to the defined operations performed by the battery packs.

In some implementations, an electronic communications interface used by a battery pack may be arranged to communicate with other battery packs in a power supply system. If a power supply is in communication with multiple battery packs, for example, the battery packs may communicate with the power supply and with each other to coordinate testing and monitoring operations. For example, a testing operation may be coordinated such that a diagnostic test is performed individually and sequentially by each of the battery packs that may deliver power to a particular power supply. Such an arrangement may be used, for example, if the execution of a diagnostic test performed by a battery pack alters the condition of another battery pack.

Various controllers (e.g., computer hardware/software systems configured to receive, process, and transmit data) may be used to monitor, control, and collect information from multiple battery packs and power supplies included in a centralized power management system. For example, the power management system 200 includes a master controller 224 that can control a power controller 226. In general, the master controller 224 may receive user commands (e.g., via a user interface) related to monitoring, controlling, and collecting information about individual devices (battery packs and/or power supplies), a group of devices, or all the devices included in a system. For example, a user may issue a command to the master controller 224 to administrator a diagnostic test performed by all of the battery packs included in the power management system 200. As another example, the user may issue a request to the master controller 224 to determine the status of a particular battery pack (e.g., battery pack 206). Moreover, the master controller 224 may maintain and execute schedules for coordinating operations (e.g., diagnostic tests, status requests, etc.) on a periodic basis (e.g., hourly, daily, weekly, etc.). In general, the power controller 226 may handle direct communications with various power supplies. For example, upon receiving a command from the master controller 224 to provide the results of a diagnostic test performed by a particular battery pack (e.g., battery pack 206), the power controller 226 may identify a power supply (e.g., power supply 204) that is in communication with the battery pack, and may forward the command to the appropriate power supply.

The power management system 200 in the present example also includes a master controller 228 (similar to or different from master controller 224) that can control a system controller 230. The system controller 230, for example, can communicate with multiple computer servers (e.g., computer server 202). Similar to the master controller 224, for example, the master controller 228 may receive user commands (e.g., via a user interface) for monitoring, controlling, and collecting information about individual devices (battery packs and/or power supplies), a group of devices, or all the devices included in a system. Also similar to the master controller 224, for example, the master controller 228 may maintain and execute schedules for coordinating operations (e.g., diagnostic tests, status requests, etc.) on a periodic basis (e.g., hourly, daily, weekly, etc.). In general, the system controller 230 may handle direct communications with individual computer servers. For example, upon receiving a command from the master controller 228 to provide the results of a diagnostic test performed by a particular battery pack (e.g., battery pack 206), the system controller 230 may identify a computer server (e.g., computer server 202) that receives power from a power supply (e.g., power supply 204) that is in communication with the battery pack, and may forward the command to the appropriate computer server. Moreover, the master controller 228 and/or the system controller 230 may distribute processing jobs among multiple computer servers. For example, each of the computer servers (e.g., computer server 202) may be assigned processing jobs by the system controller 230, which may also reassign jobs to other computer servers if a particular server encounters problems or fails.

In the present example, the power controller 226 and the system controller 230 may communicate with each other, and may communicate with other power controllers and system controllers. The power controller 226, for example, may communicate with other power controllers 232. The other power controllers 232 may receive commands from and provide information to the master controller 224, for example, and may be used to communicate with other power supplies in a distributed computing environment. The system controller 230, for example, may communicate with other system controllers 234. Similar to the other power controllers 232, for example, the other system controllers 234 may receive commands from and provide information a master controller (e.g., master controller 228), for example, and may be used to communicate with other computer servers in a distributed computing environment. For example, centralized master controllers 224, 228 may communicate with multiple power controllers and/or system controllers to monitor, control, and collect information from battery packs, power supplies, and computer servers located on different floors, in different buildings, or in different cities.

In some implementations, power supplies can be programmed to trigger testing of their respective battery packs autonomously, without prompting by another system component. For example, the power supply 204 can be programmed to periodically (e.g., once per second, minute, hour, day, week, etc.) trigger a particular test (e.g., a temperature test, a voltage test, a charge level test, a charge-ability test, etc.), and to store the information in volatile or non-volatile computer memory accessible by the power supply. The information may later be provided to a centralized power management system (e.g., the power controller 226 and/or the system controller 230 included in the power management system 200) in response to determining that a defined event has occurred.

In general, defined events may be time-based, threshold-based, and/or request-based. For example, the power supply 204 may be programmed to request that the battery pack 206 conduct a particular test at particular time intervals (e.g., once per minute, once per hour, etc.), to store information related to corresponding test results received from the battery pack, and to forward the information to the centralized power management system upon receipt of the information, or at different, greater time intervals (e.g., once per day). Thus, in the present example, the power management system may analyze batches of information to identify averages and trends related to the status of a particular battery pack or group of battery packs. As another example, the power supply 204 may be programmed to analyze test results and to send information to the centralized power management system when a test result value is under or over a predetermined threshold. For example, if the battery pack 206 provides a test result value indicating that its voltage is under a threshold value, the power supply 204 may be programmed to immediately report status information to the centralized power management system identifying the battery pack and its voltage. As another example, the power supply 204 may be programmed to store information received from the battery pack 206, and to provide the information (e.g., all stored information, information related to a particular test category, or information related to a particular test instance) to the centralized power management system upon request.

FIGS. 3A-3G shows various implementations and views of computer server systems that may be implemented with the power supply and battery pack arrangements discussed above and below. For example, computer servers may be implemented on motherboards that are placed on horizontal trays that may be slid into position in a computer server rack that contains many (e.g., dozens) of such motherboard in a vertical stack. There may be a one-to-one, one-to-multiple, or multiple-to-one relationship between the power supplies and battery packs, and between the power supplies and the motherboards. Power supplies may be located physical adjacent each corresponding tray (e.g., hanging from a front edge of the tray in front of a rack, and in an aisle of a computer data center) or may be clustered with each other, such as at the top, middle, or bottom of each corresponding rack that they each serve, or in a rack that is immediately adjacent to a rack that holds the servers that they serve. The following figures are provided to show relative physical arrangements of the components that can be implemented with such systems.

Figure 3A:
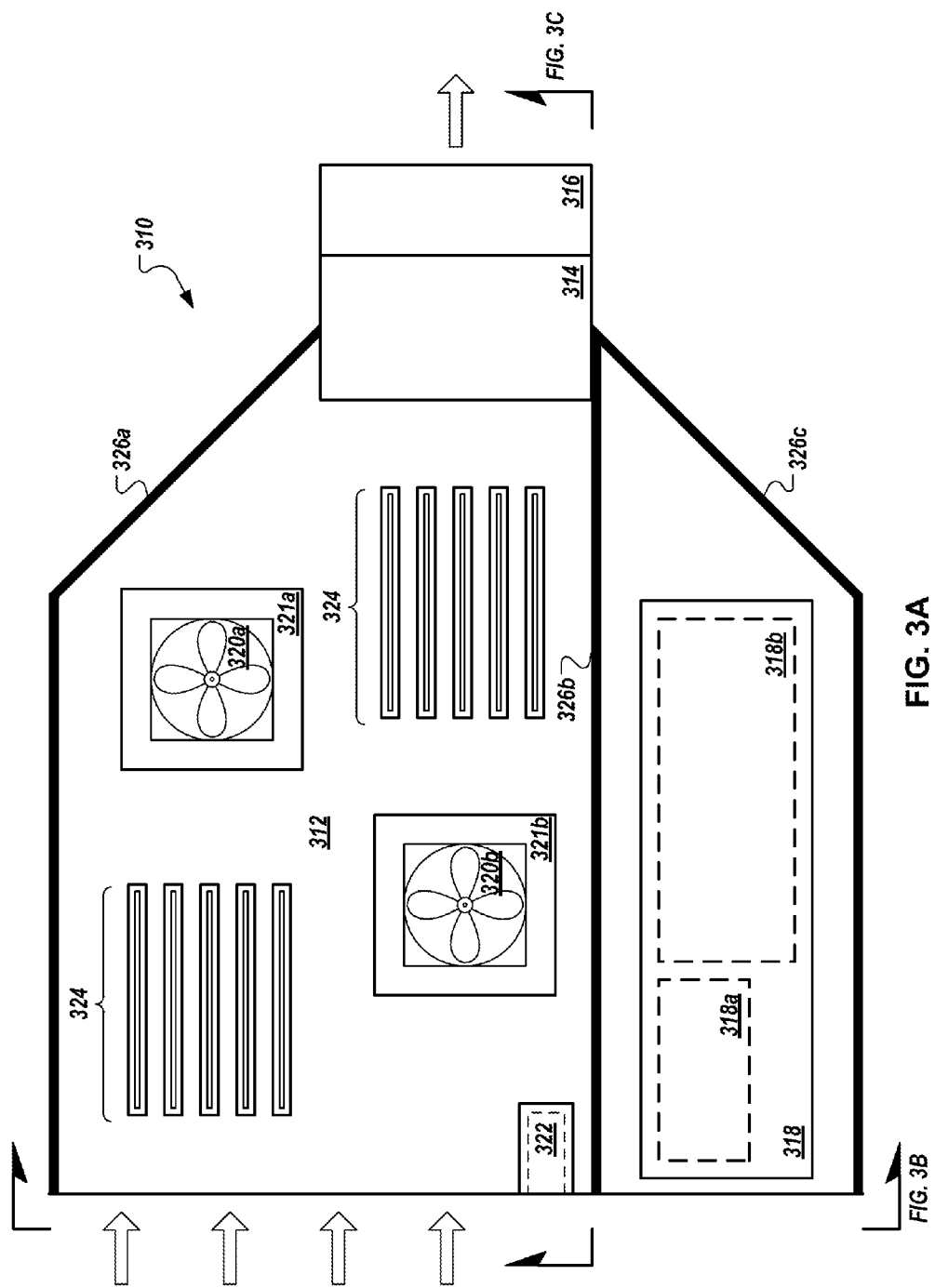
FIG. 3A shows a plan view of a tray in a rack-mount computer system.

FIG. 3A shows a plan view of a tray 310 in a rack-mount computer system, while FIG. 3B shows a front view, and FIG. 3C shows a side view, of the tray 310 in FIG. 3A. The term "tray" is not limited to any particular arrangement, but instead includes any arrangement of computer-related components coupled together to serve a particular purpose, such as on a motherboard. As shown here, a tray is a structure in which a motherboard may be paid or to which a motherboard may be mounted, and that may support the motherboard in an appropriate position when the motherboard is slid into a computer rack. Trays may be generally mounted parallel to other trays in a horizontal or vertical stack, so as to permit denser packing than would otherwise be possible with computers having free-standing housings and other components. The term "blade" may also be employed to refer to such apparatuses, though that term too should not be limited to a particular arrangement. Trays may be implemented in particular configurations, including as computer servers, switches (e.g., electrical and optical), routers, drives or groups of drives, and other computing-related devices. In general, the trays in a system take a standardized physical and electrical form to be easily interchangeable from one location in the system to another, but the trays may take other appropriate forms.

In general, the tray 310 may include a standard circuit board 312 on which a variety of components are mounted. The board 312 may be arranged so that air enters at its front edge (to the left in the figure), is routed over a number of heat generating components on the board 312, and is drawn through a power supply 314 and fan 316 before being exhausted from the tray 310. The fan 316 may also be arranged to push air through the power supply 314. In addition, the fan 316 may be located in other positions relative at other positions along the back edge of the tray and at locations away from a back edge of the tray 310. The power supply 314 may likewise be positioned at other locations and need not be joined to the fan 316.

In this arrangement, the heat from power supply 314 may be picked up after the heat from other components on the board 312 is picked up by the air flow. In this manner, the speed of fan 316 may be controlled to maintain a set temperature for the air exiting the board 312, or for temperatures at other points on the tray 310. For example, a thermocouple or other sort of temperature sensor may be placed in the air flow, such as upstream of the power supply 314 or downstream of the fan 316, and the fan speed may be modulated to maintain a set temperature. The temperature of the exiting air may also be highly elevated compared to systems that do not control airflow in this manner. It may be more efficient to cool this air than it would be to cool air that does not have such an elevated temperature.

Air may be routed over board 312 by walls 326a, 326b, 326c. Wall 326a may block one side of board 312, and may funnel air toward openings in power supply 314. Where the walls 326a, 326c do not taper, the air may otherwise be directed to the fan 316. Wall 326c may block one side of board 312, so as to prevent air from moving directly from the workspace into an area behind tray 310 (i.e., to the right in the figure). For example, a plenum may be provided behind multiple boards in the form of an open wall into which the boards may be placed, or in the form of a wall having multiple openings into which fans may be slid. In certain implementations, fully blocking or sealing of such a plenum may not be necessary, such as when the pressure difference between the plenum and the workspace is minimal.

Wall 326b separates one portion of tray 310 from another. In particular, wall 326b separates the portion of tray 310 containing heat generating components, such as microprocessors 321a, 321b, from components that generate substantially less heat, such as a battery pack 318 (including a processor 318a and battery cells 318b), and one or more hard drives (shown in FIGS. 3B and 3E). In making such a separation, wall 326b substantially blocks airflow over the components that generate less heat, and increases airflow over the heat generating components. In addition, wall 326b is arranged to route airflow into openings in power supply 314. Although not pictured, wall 326b may block areas on tray 310 but may provide that each blocked area (i.e., the area on each side of wall 326b) may still be in fluid communication with fan 316. For example, fan 316 may be designed to have openings that will lie on each side of wall 326b, and the openings may be sized or otherwise tuned so as to provide for relative levels of air flow on the opposing sides of the wall 326b. The "tuning" of the air flow may be made to match the relative thermal load of components on each side of wall 326b, so that more air flows on the side of wall 326b having the most thermal load, or that otherwise requires more cooling.

Board 312 may hold a variety of components needed in a computer system. As shown, board 312 holds a dual processor computer system that uses processor 321a and processor 321b connected to a bank of memory 324. The memory 324 may be in the form, for example, of a number of single in-line memory modules (SIMMs), dual in-line memory module (DIMMs), or other appropriate form. Other components of the computer system, such as chip sets and other chips, have been omitted for clarity in the figure, and may be selected and arranged in any appropriate manner.

Board 312 may also be provided with connections to other devices. Network jack 322, such as in the form of an RJ-45 jack or an optical networking connection, may provide a network connection for tray 310. Other connections may also be provided, such as other optical networking connections, video output connections, and input connections such as keyboard or pointing device connections (not shown).

Impingement fans 320a, 320b may be mounted above each microprocessor 321a, 321b, to blow air downward on the microprocessors 321a, 321b. In this manner, impingement fans 320a, 320b may reduce boundary layer effects that may otherwise create additional heat buildup on microprocessors 321a, 321b. As a result, lateral airflow across tray 310 can be reduced even further, while still adequately controlling the temperature rise to the microprocessors 321a, 321b.

Other heat relief mechanisms may also, or alternatively, be provided for microprocessors 321a, 321b. For example, one or more heat sinks may be provided, such as in the form of certain finned, thermally conductive structures. The heat sinks may be directly connected to microprocessors 321a, 321b, or may be located to the sides of microprocessors 321a, 321b, and may be attached by heat pipes to plates mounted to the top of microprocessors 321a, 321b. Thermally conductive grease or paste may be provided between the tops of microprocessors 321a, 321b, and any heat sinks to improve heat flow out of microprocessors 321a, 321b.

In operation, tray 310 may be mounted flat horizontally in a server rack such as by sliding tray 310 into the rack from the rack front, and over a pair of rails in the rack on opposed sides of the tray 310—much like sliding a lunch tray into a cafeteria rack, or a tray into a bread rack. Tray 310 may alternatively be mounted vertically, such as in a bank of trays mounted at one level in a rack. The front of the rack may be kept open to permit easy access to, and replacement of, trays and to permit for air to flow over the tray 310 from a workspace where technicians or other professionals operating a data center may be located. In this context, the term workspace is intended to refer to areas in which technicians or others may normally be located to work on computers in a data center.

After sliding a tray 310 into a rack, a technician may connect a tray to appropriate services, such as a power supply connection and a network connection. The tray 310 may then be activated, or booted up, and may be communicated with by other components in the system.

Although tray 310 is shown in the figures to include a multi-processor computer system, other arrangements may be appropriate for other trays. For example, tray 310 may include only hard drives and associated circuitry if the purpose of the tray is for storage. Also, tray 310 may be provided with expansion cards such as by use of a riser module mounted transversely to the board 312. Although particular forms of tray 310 may be provided, certain advantages may be achieved in appropriate circumstances by the use of common trays across a rack or multiple racks. In particular, great efficiencies may be gained by standardizing on one or a small handful of trays so as to make interaction between trays more predictable, and to lower the need to track and store many different kinds of trays.

A data center may be made up of numerous trays (hundreds or thousands), each mounted in one of numerous racks. For example, several dozen trays may be mounted in a single rack within a space, with approximately several inches between each tray. As explained in more detail below, each of the trays in a rack may back up to a warm air plenum that receives exhaust air from the trays and routes that air to a cooling unit that may re-circulate the air into the workspace in front of the racks.

Trays may also be packaged in groups. For example, two stacked trays may be matched as a pair, with one fan 316 serving both trays (not shown). Specifically, the fan 316 may be approximately double the height and diameter of a single tray unit, and may extend from the lower tray in a pair up to the top of the upper tray in a pair. By such an arrangement, the slowest turning portions of the fan, in the fan center, will be near the board of the top tray, where less airflow will normally occur because of boundary layer effects. The larger and faster moving portions of the fan 311 will be located nearer to the free areas of each tray 310 so as to more efficiently move air over the trays and through the respective power supplies more freely. In addition, a double-height fan may be able to move more air than can a single-height fan, at lower rotation speeds. As a result, a fan in such an arrangement may produce less noise, or noise at a more tolerable frequency, than could a smaller fan. Parallel fans may also be used to increase flow, and serial fans may be used to increase pressure, where appropriate.

Fan 316 may be controlled to maintain a constant temperature for air exiting fan 316 or at another point. By locating fan 316 downstream of power supply 314, and power supply 314 downstream of the other components of tray 310, the arrangement may maximize the heat rise across tray 310, while still maintaining adequately low temperatures for heat-sensitive components mounted to board 312, such as microprocessors 321a, 321b. Also, the power supply 314 may be less sensitive to higher temperatures than are other components, and so may be best located at the end of the air flow, where the temperatures are highest.

Although many applications seek to substantially increase airflow across heat generating components so as to increase the rate of heat dissipation from the components, the arrangement pictured here allows airflow across tray 310 to be slowed substantially to increase the temperature rise across tray 310. Increasing the temperature rise decreases the mass flow rate, and can make cooling across the entire system more efficient.

In particular, when the temperature of the warm exiting air is increased, the difference in temperature between the warm air and any cooling water entering a cooling coil to cool the warm air, also increases. The ease of heat transfer is generally directly proportional to this difference in temperature. Also, when the difference in temperature is relatively small, increasing the difference by only one or two degrees can produce a substantial increase in the amount of heat exchange between the warm air and the cooling water. As a result, a system run at higher exhaust temperatures from board 312 can provide substantial advantages in efficiency, and lower energy consumption.

In certain embodiments, the temperature rise across tray 310 may be approximately 20° C. As one example, air may enter the space above board 12 from a workspace at 25° C., and may exit fan 316 at 45° C. The entering temperature may also be about 21-30° C. (70-86° F.), and the exiting temperature 40-50° C. (104-122° F.). The 45° C. exhaust temperature or other temperature may be selected as a maximum temperature for which the components in tray 310 can be maintained without significant errors or breakdowns, or a safe temperature of operation. The 25° C. entering temperature or other temperature may be a temperature determined to create a comfortable or tolerable temperature in the workspace in a data center. The entering temperature may also be linked to a maximum allowable temperature, such as a federal or state OSHA-mandated maximum temperature. The entering temperature could be approximately 40° Celsius, which matches certain limits established by bodies governing workplace safety.

In other implementations, air may enter the space above board 312 at a temperature of 50° C., where appropriate thermal removal mechanisms or methods are provided for the components on board 312. For example, conductive and liquid-cooled components may be placed in contact with microprocessors 321a, 321b to increase the rate of heat dissipation from those components. Where a higher input temperature is selected, the temperature difference across tray 310 will generally be lower than if a lower input temperature is selected. However, heat will be easier to remove from such heated air when it passes through a cooling coil. Higher temperatures for expected breakdowns include components that tolerate case temperatures of 85 degrees Celsius. In addition, the exit air temperature from tray 10 may be as high as 75 degrees Celsius. An output temperature may be most easily controlled by locating a temperature sensor at the actual output (or aiming it at the actual output). Such an output temperature may also be controlled or maintained within an acceptable temperature range by placing a temperature sensor at a location away from the output, but where the difference in temperature is adequately predictable.

In the front view of FIG. 3B, one can see power supply 314 located at the back of tray 310, and perforated to permit the flow of air through power supply 314. In addition, one can see battery pack 318 and hard drive 319 located in an area walled off from the heat generating components of tray 310 by wall 326b. As noted above, the power supply 314 could also be situated so as to receive air leaving two different zones on tray 310, with the power supply 314 or other components tuned to maintain certain relative air flow rates from each side.

The side view of FIG. 2C shows more clearly the relationship of the impingement fans 320a, 320b and microprocessors 321a, 321b. The fans 320a, 320b are shown schematically for clarity. Air is pulled through the tops of fans 320a, 320b, and driven down against the top of microprocessors 321a, 321b. This process breaks up layers of warm air that may otherwise form above microprocessors 321a, 321b.

As noted above, other techniques for spot removal of heat from components such as microprocessors 321a, 321b may also be employed. As one example, heat sinks may be attached on top of or to the side of microprocessors 321a, 321b, and may be cooled by circulating air or a liquid, such as water or fluorinert liquid, or oils. Liquid supply and return tubes may be provided down each rack, with taps at which to connect pipes for cooling particular components. Circulation of liquid to the components may be driven by pressure created centrally in the system (e.g., from natural tap water pressure or large pumps) or by small pumps local to a particular tray 310. For example, small peristaltic, centrifugal, vane or gear-rotor pumps may be provided with each tray to create liquid circulation for the tray 310.

Alternatively, a portion of a rack or a component associated with a rack may be cooled, such as by passing liquid through passages in the component. Heat sinks for each heat generating component may then be coupled physically to the cooled component in the rack so as to draw heat out of the components on the tray 310 and into the rack. As one example, a vertical runner on the rack may be provided with clamps into which heat pipes attached to heat-generating components on tray 312 are received, so that the heat pipes may pull heat away from those components and into the runner. The runner may further include fluid passages to carry cooling fluid. Thus, the runner will be kept cool, and will draw heat by conduction from the heat-generating components.

Figure 3D:
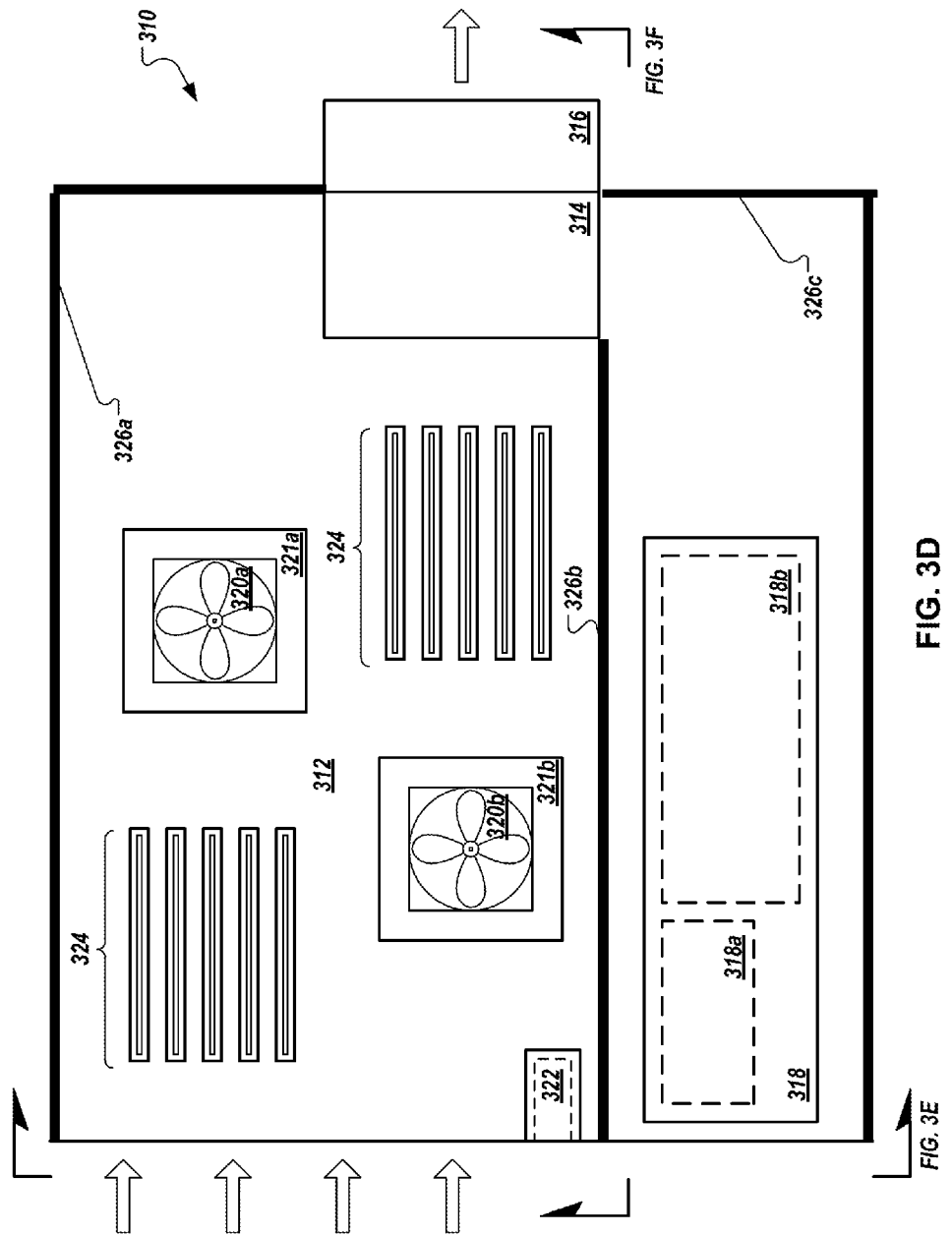
FIG. 3D shows a plan view of a tray in a rack-mount computer system, having dual-zone power supply ventilation.

FIG. 3D shows a plan view of a tray in a rack-mount computer system, having dual-zone power supply ventilation. FIG. 3E shows a front view of the tray in FIG. 3D. FIG. 3F shows a side view of the tray in FIG. 3D. The general arrangement of components on the tray 312 here is similar to that in FIGS. 3A-3C, although the particular arrangement and layout of components is not generally critical. However, in these figures, the wall 326*b* has its rear edge pulled forward from the back wall of the tray 312. Also, the power supply 314 has two areas of openings—one on its front edge, as can be seen in FIG. 3E, and one on its side edge, as can be seen in FIG. 3F. The openings on the front edge generally provide ventilation for the hot side of the tray 312, while those on the side edge provide ventilations for the cool side of the tray 312.

The openings may be sized or otherwise organized to provide particular approximate levels of ventilation to each side of the tray 312. As can be seen in FIGS. 3E and 3F, the front edge of the power supply 314 has more holes than does the edge; in addition, the air flow from the front edge is straight, while air coming in through the side edge needs to curve. As a result, the front edge will provide a higher level of ventilation than will the side edge, and will thus be able to carry away the higher level of heat generated on the hot side of tray 312. The amount of air carried on a hot side might also be lower than on a cool side, such as where equipment requirements force the cool side to stay at a low temperature. In other words, in setting flow rates for each portion of tray 312, both heat generation and desired operating temperature may be taken into account.

Figure 3G:
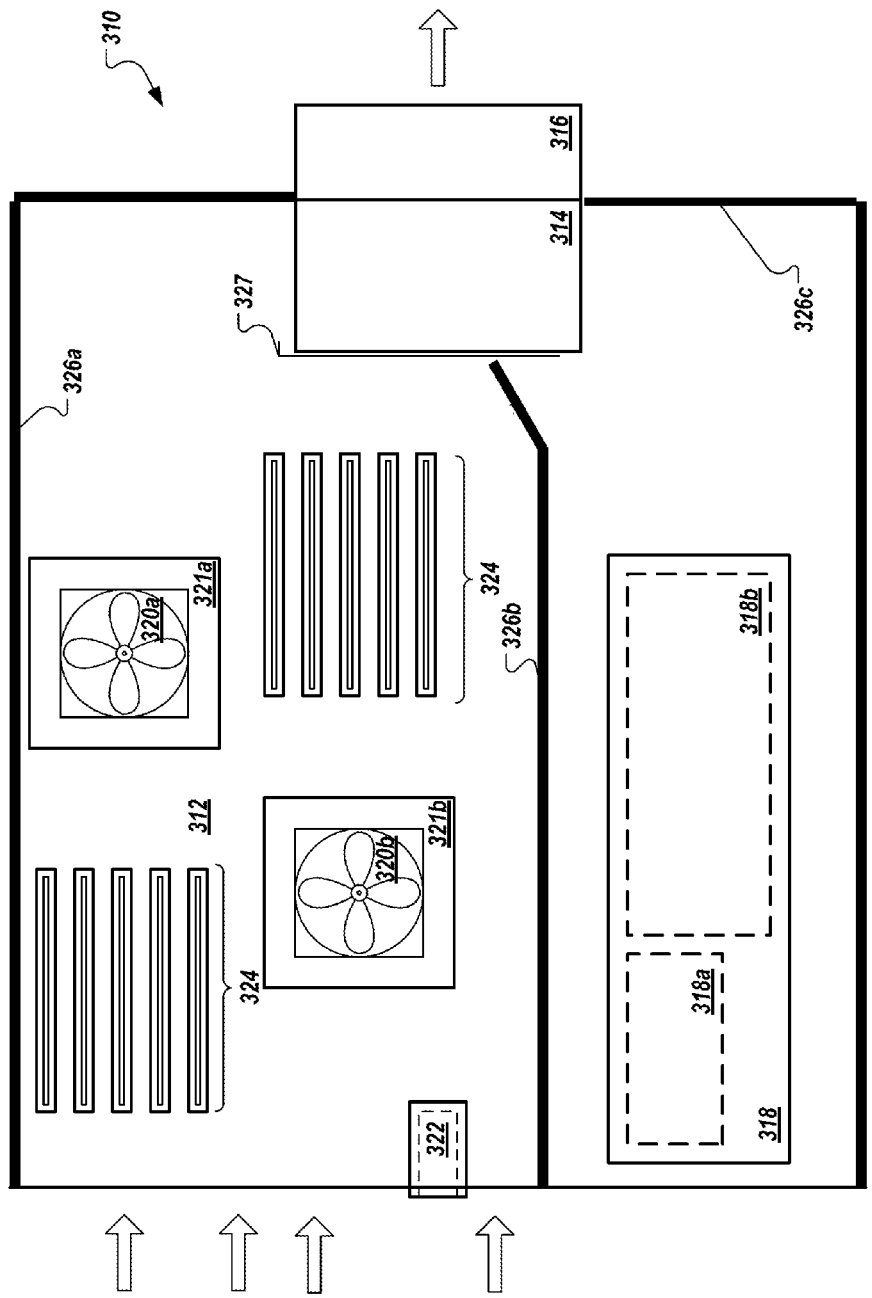
FIG. 3G shows a plan view of a tray in a rack-mount computer system, having dual-zone adjustable power supply ventilation.

FIG. 3G shows a plan view of a tray in a rack-mount computer system, having dual-zone adjustable power supply ventilation. Here, the wall 326*b* is positioned to direct a certain amount of ventilating air from each side of wall 326*b*. The wall 326*b* may be positioned on tray 312 at an appropriate position, and its terminal end may be made adjustable through pivoting or other mechanisms, so as to permit on-site adjustment of air flow.

In addition, gate 327 may be provided over a front surface of power supply 314 to provide adjustment to the size of openings on the front surface via openings in the gate 327 that form an interference pattern with openings on power supply 327 (much like the openings on certain spice containers). The interference pattern may be different for each side of tray 312, so that moving the gate 327 causes a greater effect on the airflow for one side of tray 312 than it does for the other side of tray 312.

Temperature-dependent mechanisms may also be provided to control the flow of air through power supply 314. For example, polymer or metallic materials that change shape with temperature may be used to form openings that close as their temperature falls—thereby driving back up the exit temperature of air from a particular portion of tray 312. As one example, the materials may produce a form of stoma that opens and closes. Also, mechanisms such as temperature-controlled louvers, or a temperature-controlled actuator on gate 327 may be used to control airflow over board 312. Such air control mechanisms may also be located off of tray 312. For example, a wall perforated by temperature dependent stoma may be placed behind a number of racks filled with trays, and may thereby control the exit temperature for all of the racks in a convenient manner. In such a situation, as in others discussed herein, fan 316 may be eliminated from tray 312, and a central ventilation system may pull air through the various trays and racks.

Figure 4:
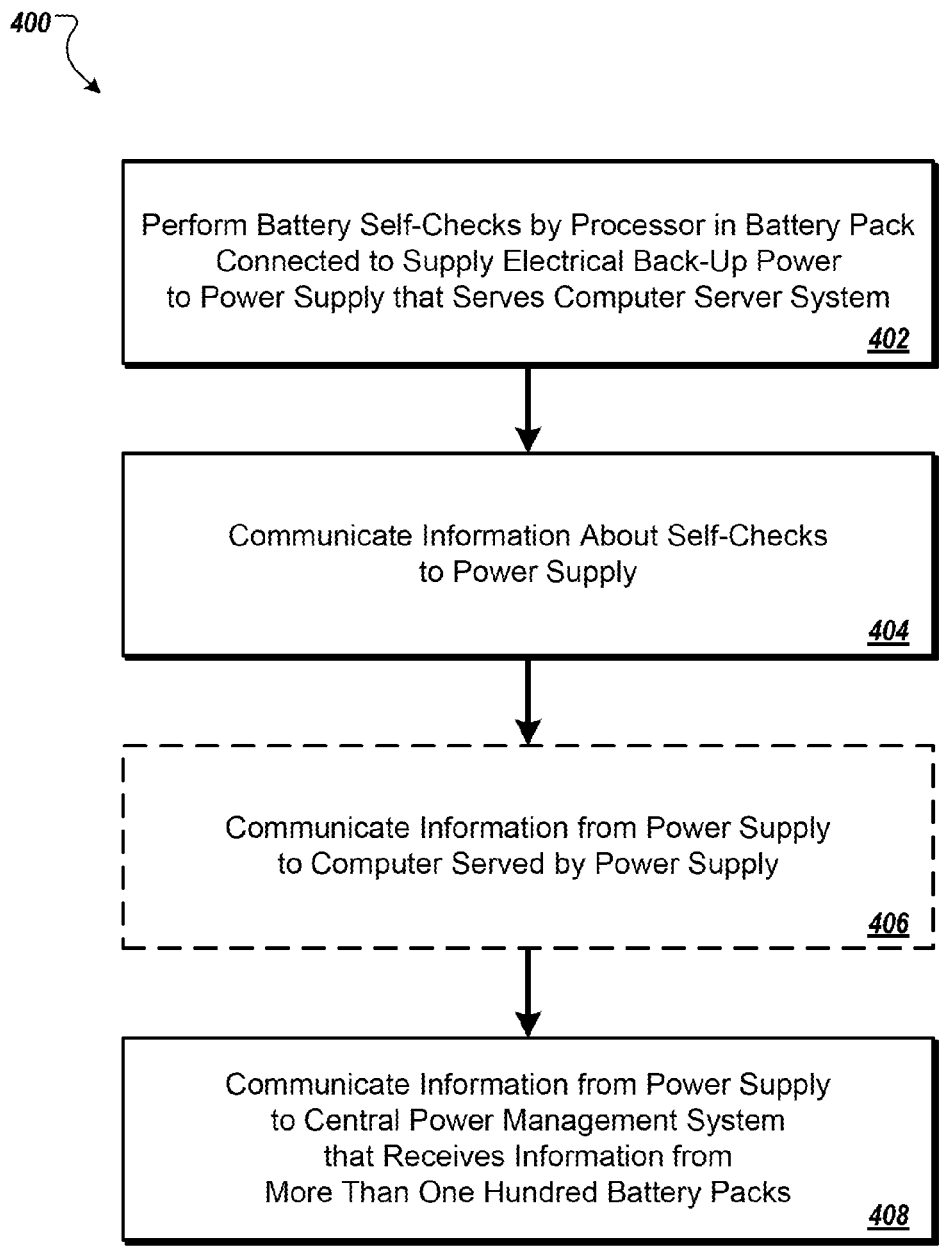
FIG. 4 is a flow diagram of actions for managing power in a computer server system.

FIG. 4 is a flow diagram 400 of actions for managing electric power in a computer server system. The process presented by the flow diagram 400 may be performed by systems such as the power-supply system 100 (shown in FIG. 1) and the power management system 200 (shown in FIG. 2), and will be described as such for clarity. In general, the process includes performing battery self-checks by a processor in a battery pack, communicating information about the self-checks to a power supply, and communicating the information from the power supply to a central power management system that receives information from many (e.g., more than one hundred) battery packs.

The process begins at box 402, where battery self-checks are performed by a processor in a battery pack that is connected to supply electrical back-up power to a power supply that serves a computer server system. Referring to FIG. 1, for example, the battery pack 106 can use the processor 110 to monitor and/or control its battery cells 108 and other peripheral devices, such as temperature and humidity controlling devices. Self-checks may be generally performed by the battery pack 106 using one or more sensors (e.g., temperature, voltage, current, etc.) and controllers (e.g., regulators, balancers, fans, etc.). To perform a self-check, for example, the processor 110 may execute one or more defined operations associated with the check. For example, a temperature self-check can include reading a value from a temperature sensor. As another example, a chargeability self-check may include a series of interrelated and programmed operations, such as a charge level check, followed by a discharge operation, followed by a series of timed charge operations, charge level checks, and temperature checks.

At box 404, information about the self-checks is communicated to the power supply. For example, after performing a temperature self-check, the battery pack 106 may communicate a corresponding temperature value to the power supply 102. As another example, a dataset corresponding to a chargeability self-check may be communicated to the power supply 102 upon completion of the check, or individual data values may be communicated as the check progresses. In general, information about self-checks may be communicated periodically, upon a condition of a battery pack, and/or upon request of another system component (e.g., a controlling power supply and/or computer server). Moreover, periodically performed and reported self-checks may trigger subsequent self-checks. For example, the battery pack 106 may provide the power supply 102 with information about a temperature self-check according to a predetermined schedule (e.g., once a minute, once every five minutes, etc.). Upon detecting a particular condition (e.g., a temperature threshold is exceeded), the power supply 102 may request that the battery pack 106 perform a subsequent self-check to determine the health of the battery cells 108 and/or the power supply may perform operations to regulate the condition (e.g., turning on a fan).

In some implementations, information about self-checks may be communicated from the battery pack to the power supply over a single-wire interface. For example, the battery pack 106 can use the connector 112 to communicate information to and receive information from the power supply 102. In some implementations, a multi-wire interface may be used to communicate information about self-checks. For example, a wire may be used to communicate management data (e.g., requests, controlling instructions, etc.), and another wire may be used to communicate status information (e.g., results of diagnostic operations).

At box 406, the information about the self-checks is optionally communicated to a computer served by the power supply. Upon receiving the information from the battery pack 106, for example, the power supply 102 may use the inter-integrated circuit bus 120 to communicate the information to the computer server 104. Upon receiving the information from the power supply 102, for example, the computer server 104 may process the information, and may provide instructions for the power supply 102 to forward to the battery pack 106.

At box 408, the information about the self-checks is communicated from the power supply to a central power management system that receives information from many (e.g., more than one hundred) battery packs. Referring to FIG. 2, for example, the power supply 204 can communicate information to the power controller 226 included in the power management system 200 over a shared local area network using the network connection 220. Similarly, the computer server 202 can communicate information to the system controller 230 over the shared local area network using the network connection 222. In some implementations, information may be transformed by a power supply or by a computer server before being sent to the central power management system. For example, the power supply 204 and/or the computer server 202 can filter information (e.g., non-critical information such as information that does not indicate a change from a previous status value), can compile information received over a period of time to identify data trends and patterns, can perform information processing to aggregate the results of self-checks that involve multiple operations and sensor readings, can format the information to use a data exchange protocol of the central power management system, and/or can perform other appropriate sorts of information transformation. Moreover, the power supply 204 may communicate information to the power controller 226 that may be applicable to power control operations, whereas the computer server 202 may communicate information to the system controller 230 that may be applicable to systems operations. For example, if a self-check performed by the battery pack 206 indicates that its battery cells 210 are not healthy, status information may be provided to the power supply 204, which may send the information to the power controller 226 and to the master controller 224, so that the condition can be reported and corrective maintenance (e.g., replacing the battery cells 210) may be performed. Meanwhile, for example, the status information may be provided to the computer server 202, which may send the information to the system controller 230 and the master controller 228, so that processing jobs may be offloaded to other computer servers until the battery pack 206 receives its maintenance.

In some implementations, information about self-checks may be communicated from a battery pack to a power supply in response to a request from the power supply, but without a request from a central power management system. For example, the power supply 204 may autonomously request for the battery pack 210 to perform a particular operation (e.g., a monitoring and/or controlling action). The power supply 204, for example, may include one or more computer processors and memory devices programmed to periodically request that connected battery packs perform particular checks, and to potentially request that the battery packs perform additional checks based on received information associated with the results. Further, the information may be stored at the power supply until the occurrence of a determined event, at which time the information is communicated to the central power management system. For example, the power supply 204 can store the results in its local memory until it is to be communicated to the power controller 226. In general, determined events may include various time-based, threshold-based, and/or request-based factors, as will be discussed in examples below.

Determined events may include requests from the central power management system. For example, the master controller 224 and/or the power controller 226 may request information from (or issue a command to) a particular battery pack (e.g., battery pack 206) or power supply (e.g., power supply 204) included in the power management system 200. Upon receiving the request or command, for example, the battery pack 206 or power supply 204 can perform a corresponding operation (e.g., sensing and/or control), and can provide information resulting from the operation. Moreover, the central power management system may request information from (or issue commands to) groups of battery packs or power supplies, or to all of the battery packs or power supplies included in the system (e.g., as a broadcast message).

Determined events may include occurrences of a determined time or an elapsed time. The power supply 204, for example, may include a clock and a memory device for maintaining a schedule, and may provide information to the central power management system (e.g., the power controller 226 and/or the system controller 230) based on the schedule and the clock. For example, if a determined time (e.g., 12:00 noon) occurs, the power supply 204 may refer to its schedule and may identify any information it is scheduled to provide to the central power management system at the determined time. As another example, the clock may trigger events at determined time intervals (e.g., once per minute, once per hour, once per day, etc.). At the occurrence of a determined or elapsed time, for example, the power supply 204 may provide the central power management system with all of the information stored in its memory, or may provide a portion of the information, such as the information associated with a particular type of self-check. Moreover, information associated with different types of self-checks may be provided at different times or time intervals. For example, information associated with charge levels may be provided once per hour, whereas information associated with chargeability status may be provided once per day (e.g., at 12:00 noon).

Furthermore, determined events may include an accumulation of a determined amount of data at the power supply. For example, if the power supply 204 accumulates the determined amount of data, the data may be communicated to the power controller 226 and/or the system controller 230 as a batch. Upon receiving an acknowledgement message, for example, the power supply may clear its memory for receipt of additional data.

Determined events may alternatively or additionally include determinations that a condition of the battery pack has been met. For example, a value associated with a temperature self-check performed by the battery pack 206 may be received and evaluated by the power supply 204, and an appropriate action may be performed by the power supply based on the value. If, for example, the value is under a first threshold (e.g., a "normal" temperature value), the power supply 204 may store the information and perform no action. However, if the value is over the first threshold, but under a second threshold (e.g., an "elevated" temperature value), the power supply 204 may perform one or more operations (e.g., requesting that the battery pack 206 perform a follow-up check, turning on or increasing the speed of a fan, etc.). Further, if the value is over the second threshold (e.g., a "dangerous" temperature value), the power supply 204 may perform one or more operations, and may communicate information about the self-check to the central power management system. Thus, for example, an alert may be provided to the power controller 226, the master controller 224, and to a system user, when warranted by a condition of a battery pack.

Thus, as described in the preceding examples, monitoring and controlling operations may be distributed among battery packs, power supplies, computer servers powered by the power supplies, and one or more centralized power and system controllers. Further, based on status information provided by battery packs, appropriate actions may be performed by appropriate components of a centralized power system, at appropriate times. For example, routine status information may be handled routinely (and sometimes, autonomously), whereas non-routine status information (such as information related to a failure or emergency) may be escalated and acted upon.

In certain other embodiments, implementations with rechargeable battery packs like those described here can be provided as a drop-in replacement for non-rechargeable packs that need to be managed in a different manner than what is described here. For example, in a first step, one or more computer systems may be operating with power supplies connected to non-rechargeable batteries. Such batteries may be smart (e.g., they may include a processor and a communication interface, among other similar features) or may be passive (e.g., just battery cells and perhaps some limited diagnostic capabilities, but no ability to communicate outside the back except perhaps for the most basic of information). A technician may disconnect the battery pack from the power supply and replace it with a rechargeable battery pack. Such a new connection may include power connections, but also a data connection between the rechargeable battery pack and the power supply.

Upon the connection of the rechargeable battery pack, a software update for the power supply may be initiated. Such initiation may occur, for example, by an operator at a central system entering an identifier for the power supply so that the central system pushes out a software update. The update may occur by a technician scanning a bar code, NFC tag, or similar item at the power supply or a related component, and such scanning may cause an update to be instigated (either alone or in combination with another action, such as a technician holding the scanner indicating that the power supply should receive an update). Alternatively, the power supply may be programmed to request update information from a central management system whenever a change is made with respect to it, such as by the replacing of a battery pack connected to it. The update for software on the power supply may include commands for carrying out operations related to the testing, and maintenance of the rechargeable battery pack, where such software was not needed for the prior non-rechargeable battery pack.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A power-supply system for computer servers, comprising:
a plurality of battery packs that each include, as part of a common battery pack unit, (a) a plurality of battery cells, (b) a computer system for performing battery condition checks by executing one or more computer programs stored on tangible media, and (c) an interface arranged to decode command messages and, in response, to communicate information about one or more of the battery cells to a computer server power supply that is connected to receive power from a respective battery pack and to provide low-voltage power to a computer server;
a plurality of power supplies, each connected to receive power from and to communicate with an associated one or more of the plurality of battery packs to cause the associated one or more battery packs to execute the one or more computer programs to receive information from the associated one or more battery packs, each power supply also having one or more power connections to supply low voltage power to one or more computer servers, and to switch between providing main power and providing power from an associated battery pack when main power is not available; and
a plurality of computer servers, each mounted in computer racks with other computer servers and connected to be powered from line power or battery power selectively provided by particular ones of the plurality of power supplies, wherein each computer server receives electric power from a respective power supply of the plurality of power supplies and connects the respective power supply of the plurality of power supplies to a central data network to which other computer servers and power supplies are connected for communication with the plurality of battery packs;
a central power management system connected over the central data network with the plurality of power supplies and arranged to obtain, from interfaces controlled by computer systems in each one of the plurality of power supplies, information generated from executing the computer programs on computer systems in each of the plurality of battery packs,
wherein the battery packs identify one or more factors that characterize a current health of the battery packs and based on the current health arrange communication with the power supplies.

2. The system of claim 1, wherein each of the plurality of battery packs is programmed to test itself autonomously without prompting by another system component.

3. The system of claim 1, wherein the plurality of power supplies are programmed to trigger execution of the one or more computer programs on their respective battery packs autonomously without triggering by the central power management system, to store information received as a result of executing the one or more programs, and to later provide the received information to the central power management system in response to determining that a defined event has occurred.

4. The system of claim 1, wherein each power supply is connected to one or more battery packs via a single-wire interface, and connected to the central power management system by a local area network that is different than the single-wire interface and connects through a respective computer server.

5. A power-supply system, comprising:
a battery pack that includes:
a plurality of rechargeable battery cells;
a processor in the battery pack connected to execute one or more computer programs, in response to decoding a received message, to test the plurality of rechargeable battery cells and execute a diagnostic routine for determining a state of health of the plurality of rechargeable battery cells;
an electronic communications interface of the battery pack arranged to communicate through a network interface of a computer server that is connected to receive back-up power from the battery pack with a central power management system that controls a plurality of battery packs that each serve one or more distinct electric machines, the interface communicating through a computer power supply to which the battery pack provides power; and
an electric power interface of the battery pack arranged to supply power to the computer power supply, which is capable of switching between providing a server system electric power from the battery pack and power from a source separate from the battery pack,
wherein the battery pack is programmed to execute one or more computer programs to respond to a request from the central power management system through the computer power supply for status information and to respond with data that indicates a current status of the plurality of battery cells consistent with the decoding of the received message, and
the battery pack is programmed to respond to a request from the central power management system through the computer power supply to identify one or more factors that characterize a current health of the battery pack and to respond with data that indicates a current status of the health of the battery pack.

6. The system of claim 5, wherein the connector implements a single-wire data connection for communicating data between the battery pack and the power supply, and a power connection for carrying electric power from the battery pack to the power supply.

7. The system of claim 5, wherein
the computer power supply is arranged to supply direct current power to one or more computers in a computer system, and
the electronic communications interface of the battery pack communicates with the central power management system through the computer power supply.

8. The system of claim 7, wherein the computer power supply communicates with the battery pack over a single-wire connection and communicates with other components via an i2C bus.

9. The system of claim 7, wherein the computer power supply is arranged as a master, and the battery pack as a slave, in a master-slave relationship.

10. The system of claim 7, wherein the battery pack is a slave to a microprocessor of a computer server that is powered by the computer power supply through which the battery pack supplies power.

11. The system of claim 7, wherein the computer power supply is programmed to request information from the battery pack without being prompted by a request external to the computer power supply and to store information received from the battery pack until occurrence of a defined event, upon which the computer power supply is programmed to provide the information to a central power management system.

12. The system of claim 11, wherein the computer power supply is connectable to multiple battery packs at one time.

13. The system of claim 5, wherein the battery pack has an assigned IP address.

14. The system of claim 5, wherein the electronic communication interface for the battery pack is arranged to communicate with electronic communication interfaces for other battery packs in a power supply system.

15. A method for managing power in a computer server system, the method comprising:
performing battery self-checks by a processor in a battery pack that is connected to supply electrical back-up power to a computer power supply that serves a computer server system, the battery pack including battery cells and a computer system that includes the processor and is programmed for performing battery condition checks by executing one or more computer programs with the processor of the battery pack in response to decoding commands received from the computer power supply;
communicating information about the self-checks to the computer power supply; and
communicating the information, from the power supply and through a network interface of the computer server system to which the power supply serves power, to a central power management system that receives information from more than one hundred battery packs, wherein the performing of battery self-checks and communicating the information from the power supply occurs without triggering from the central power management system, to obtain information generated from executing the computer programs on computer systems in each of a plurality of battery packs, and the self-checks comprise executing a test that identifies one or more factors that characterize a current health off the battery pack or at least one cell within the battery pack.

16. The method of claim 15, further comprising communicating the information from the power supply, to a computer served by the power supply, before communicating the information to the central power management system.

17. The method of claim 15, wherein the information is communicated from the battery pack to the power supply in response to a request from the power supply but without a request from the central power management system, and is stored at the power supply until the occurrence of a determined event, at which time the information is communicated to the central power management system.

18. The method of claim 17, wherein the determined event is selected from a group consisting of, a request from the central power management system, occurrence of a determined time or elapsed time, determination that a condition of the battery pack has been met, and accumulation of a determined amount of data at the power supply.

19. The method of claim 15, wherein the information is transformed by the power supply before being sent to the central power management system.

20. The method of claim 15, wherein the information is communicated from the battery pack to the power supply over a single-wire interface.

21. The method of claim 15, wherein the information is communicated from the power supply to the central power management system over a shared local area network.

22. The power-supply system of claim 1, wherein the communication to identify one or more factors that characterize the current health of the battery packs comprises a communication to perform stress tests on the battery packs.

23. The power-supply system of claim 1, wherein the one or more factors comprise at least one load put on the battery packs by the power supplies.

* * * * *